US012657743B2

(12) United States Patent
Adamski et al.

(10) Patent No.: US 12,657,743 B2
(45) Date of Patent: Jun. 16, 2026

(54) COMBINING ANGIOGRAPHIC INFORMATION WITH FLUOROSCOPIC IMAGES

(71) Applicant: Brainlab SE, Munich (DE)

(72) Inventors: Martin Adamski, Munich (DE); Ferdinand Storch, Munich (DE)

(73) Assignee: BRAINLAB SE, Munich (DE)

( * ) Notice: Subject to any disclaimer, the term of this patent is extended or adjusted under 35 U.S.C. 154(b) by 286 days.

(21) Appl. No.: 18/275,983

(22) PCT Filed: Apr. 13, 2021

(86) PCT No.: PCT/EP2021/059573
§ 371 (c)(1),
(2) Date: Aug. 4, 2023

(87) PCT Pub. No.: WO2022/218511
PCT Pub. Date: Oct. 20, 2022

(65) Prior Publication Data
US 2024/0095936 A1     Mar. 21, 2024

(51) Int. Cl.
*G06T 7/30*          (2017.01)
*G06T 7/00*          (2017.01)
*G06T 7/38*          (2017.01)

(52) U.S. Cl.
CPC .............. *G06T 7/30* (2017.01); *G06T 7/0014* (2013.01); *G06T 7/38* (2017.01);
(Continued)

(58) Field of Classification Search
CPC .......... G06T 7/30; G06T 7/0014; G06T 7/38; G06T 2207/10121; G06T 2207/20221;
(Continued)

(56) References Cited

U.S. PATENT DOCUMENTS

2010/0194851 A1* 8/2010 Pasupaleti ............ H04N 1/3876
                                                            348/E7.001
2019/0357886 A1* 11/2019 Cao ........................ A61B 8/085

FOREIGN PATENT DOCUMENTS

EP          3381371 A1      10/2018
WO      2022218511 A1      10/2022

OTHER PUBLICATIONS

Laly Florent et al: "A Hybrid Image Fusion System for Endovascular Interventions of Peripheral Arty Disease". International Journal of Computer Assisted Radiology and Surgery, Sprinter, DE vol. 13, No. 7 Mar. 16, 2018 (Mar. 16, 2018), pp. 997-1007, XP036532797, ISSN: 1861-6410, DOI: 10.1007/S11548 (Year: 2018).*

(Continued)

*Primary Examiner* — Stephen P Coleman
(74) *Attorney, Agent, or Firm* — Gray Ice Higdon

(57) ABSTRACT

According to the present invention, a plurality of image pairs, each consisting of a fluoroscopic image and an angiographic image taken from the same position and the same viewing direction onto the patient, is acquired. A live fluoroscopic image is registered individually with each fluoroscopic image within the image pairs, such that the spatial relationship between the live fluoroscopic image and the fluoroscopic images, and thus with the angiographic images and the image pairs in general, becomes known. Angiographic information representing the vascular structure can then be taken from those parts of the angiographic images within the image pairs which overlap with the live fluoroscopic image and be overlayed over the live fluoroscopic image.

15 Claims, 7 Drawing Sheets

(52) U.S. Cl.
CPC ............... *G06T 2207/10121* (2013.01); *G06T 2207/20221* (2013.01); *G06T 2207/30101* (2013.01)

(58) Field of Classification Search
CPC ......... G06T 2207/30101; G06T 7/0016; G06T 2207/10116
USPC ........................................................ 382/130
See application file for complete search history.

(56) References Cited

OTHER PUBLICATIONS

A_hybrid_image_fusion_system_LALY_FLORENT.pdf (Year: 2018).*

International Search Authority, International Search Report and Written Opinion issued in Application No. PCT/EP2021/059573, 16 pages, dated Jan. 7, 2022.

Lalys Florent et al., A Hybrid image fusion system for endovascular interventions of peripheral artery disease, International Journal of Computer Assisted Radiology and Surgery, Springer, DE, vol. 13, No. 7, pp. 997-1007, XP036532797, dated Mar. 16, 2018.

Kumar Abhinav et al., Automatic Image Alignment and Stitching of Medical Images with Seam Blending, Retrieved from https://publications.waset.org/12878/automatic-image-alignment-and-stitching-of-medical-images-with-seam-blending, XP055871755, 6 pages, dated May 21, 2010.

* cited by examiner

C1     CL     C2

B1          W          V          B2

COMBINING ANGIOGRAPHIC INFORMATION WITH FLUOROSCOPIC IMAGES

FIELD OF THE INVENTION

The present invention relates to a computer-implemented method for overlaying angiographic information over a fluoroscopic image of a patient, a corresponding computer program, a computer-readable storage medium storing such a program and a computer executing the program, as well as a medical system comprising the aforementioned computer.

TECHNICAL BACKGROUND

Angiographic images representing at least a part of the vascular structure of a patient are helpful tools in medical applications, for example for monitoring a medical intervention. But capturing angiographic images involves the administration of a contrast agent, which can be toxic to the patient, such that capturing a sequence of live angiographic images is disadvantageous. This document relates to an alternative in which angiographic imaging is performed only once and the vascular structure comprised in the angiographic images is overlayed over live fluoroscopic images of the patient.

The present invention can be used for PAD (Peripheral Artery Disease) procedures e.g. in connection with a medical navigation system of Brainlab AG.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

According to the present invention, a plurality of image pairs, each consisting of a fluoroscopic image and an angiographic image taken from the same position and the same viewing direction onto the patient, is acquired. A live fluoroscopic image is registered individually with each fluoroscopic image within the image pairs, such that the spatial relationship between the live fluoroscopic image and the fluoroscopic images, and thus with the angiographic images and the image pairs in general, becomes known. Angiographic information representing the vascular structure can then be taken from those parts of the angiographic images within the image pairs which overlap with the live fluoroscopic image and be overlayed over the live fluoroscopic image.

GENERAL DESCRIPTION OF THE INVENTION

In this section, a description of the general features of the present invention is given for example by referring to possible embodiments of the invention.

In general, the invention reaches the aforementioned object by providing, in a first aspect, a computer-implemented medical method of overlaying angiographic information over a fluoroscopic image of a patient. The method comprises executing, on at least one processor of at least one computer (for example at least one computer being part of a navigation system), the following exemplary steps which are executed by the at least one processor.

In a (for example first) exemplary step, a plurality of image pair data are acquired, each image pair data representing an image pair and comprising fluoroscopic image data and angiographic image data representing a fluoroscopic image and an angiographic image, respectively, of at least a part of the patient. The fluoroscopic image and the angiographic image of an image pair are taken from the same position and the same viewing direction onto the patient.

An image pair comprises a fluoroscopic image and an angiographic image captured using a medical imaging system such as an X-ray imaging system. The angiographic image is taken under administration of a contrast agent, while the fluoroscopic image is taken without the administration of a contrast agent. It shall be pointed out that the present invention does not relate to capturing the fluoroscopic image or the angiographic image, and in particular not to administering a contrast agent, but rather to image processing in order to combine angiographic information with a live fluoroscopic image.

The fluoroscopic image and the angiographic image of an image pair are preferably taken with the same position of the medical imaging device relative to the patient, and thus, from the same position and the same viewing direction onto the patient. This means that the fluoroscopic image and the angiographic image of an image pair are spatially aligned and thus congruent. They thus show the same part of the patient.

An raw angiographic image basically shows the same content as a fluoroscopic image, but in addition the vascular structure due to the contrast agent. In one embodiment, the angiographic image represented by the angiographic image data is generated by subtracting the corresponding fluoroscopic image from the raw angiographic image as captured, such that only the difference, which is caused by the contrast agent in the vascular structure of the patient, remains in the angiographic image.

Typically, the images of an image pair are captured by positioning the imaging device relative to the patient, capturing a fluoroscopic image, administering a contrast agent and capturing a raw angiographic image. The contrast agent disappears while the imaging system is positioned relative to the patient again for capturing another image pair. The angiographic image is calculated from the fluoroscopic image and the raw angiographic image as described above. In an alternative, the fluoroscopic image can be captured after capturing the raw angiographic image.

Since the field of view of medical imaging systems is limited, in particular if a particular image resolution is desired, a plurality of image pairs is captured, for example while moving the medical imaging device along the patient between capturing the image pairs. In one embodiment, a sequence of image pairs is captured, wherein the images of neighbouring image pairs partially overlap. The plurality of image pairs thus represent an area of the patient which is larger than the field of view of the medical imaging device, and thus larger than the area which could be covered by a single image pair.

In a (for example second) exemplary step, a set of image pair registration data is calculated, each image pair registration data representing the spatial orientation between two neighbouring image pairs.

In this document, two neighbouring image pairs are two image pairs whose images partially overlap. The spatial orientation is for example described the relative position between reference systems assigned to the image pairs. The spatial orientation is such that areas of the image pairs which show the same part of the patient overlap each other. So if the fluoroscopic images or angiographic images of two neighboring image pairs were displayed with an alignment according to the corresponding determined spatial orientation, a continuous image covering a larger area than just a single image pair results.

The registration data can be calculated using known image fusion techniques, for example rigid image fusion. In one embodiment, neighbouring image pairs are shifted along the imaging plane and rotated about an axis perpendicular to the imaging plane in order to find the alignment between the two image pairs.

The result of the fusion of two image pairs can be that no registration has been found, which is for example be case if the two image pairs do not overlap. In this case, a corresponding information or no data can be added to the set of image pair registration data.

It shall be emphasised that the image pairs are not actually merged or stitched to larger fluoroscopic and/or angiographic images. The image pairs remain as they are, and only their relative position is obtained.

In a (for example third) exemplary step, live fluoroscopic image data representing a live fluoroscopic image of the patient is acquired.

While the image pairs are taken at a first point in time, the live fluoroscopic image is taken at a second point in time which is later than the first point in time. The live fluoroscopic image is used to monitor the patient, for example for visualising an object in the patient, such as a medical instrument. Since the live fluoroscopic image is taken without the administration of a contrast agent, the vascular structure of the patient is not visible in the live fluoroscopic image.

In this document, the word "live" means that the second point in time is later than the first in time, and that the live fluoroscopic image is captured shortly before the data processing of the present invention is performed, preferably only a second or a fraction of a second before. The word "live" thus means that the current situation of the patient can be seen. It can further mean that a sequence of live fluoroscopic images can be captured and the data processing of the present invention is performed in real time, which for example means with a delay of for example one second or preferably less, such as a fraction of a second.

In a (for example fourth) exemplary step, the live fluoroscopic image data is registered with the fluoroscopic image data of each image pair, thus obtaining the spatial orientation between the live fluoroscopic image and each image pair.

Like in the step of calculating a set of image pair registration data, the spatial location means a relative position between two images such that areas of the two images which show the same part of the patient overlap each other.

The result of this fourth step is that it is known which parts of the live fluoroscopic image overlap with which areas of the fluoroscopic images in the image pairs. It is thus known which parts of the angiographic images of the image pairs overlap with parts of the live fluoroscopic images.

The registration in the fourth step can optionally involve an elastic fusion of the image pairs with the live fluoroscopic image. In this case, the fluoroscopic images are deformed to match the live fluoroscopic image as good as possible. The same deformation is applied to the corresponding angiographic images.

In a (for example fifth) exemplary step, angiographic overlay image data are determined from the angiographic image data based on the spatial orientation between the live fluoroscopic image and each image pair.

For example, the angiographic image overlay data is determined from the overlapping areas of the angiographic images which overlap with the live fluoroscopic image.

It shall be noted that it might not be necessary to register the live fluoroscopic image data with the fluoroscopic image data of each image pair, but only with the fluoroscopic image data of each image pair in which an overlap of the live fluoroscopic image with the fluoroscopic image of the image pair can be expected. If, for example, the position of the x-ray imaging device is tracked when capturing the plurality of image pairs and live fluoroscopic image, it is possible to determine those image pairs which can have an overlap with the live fluoroscopic image.

In a (for example sixth) exemplary step, the angiographic overlay image data are overlayed over the live fluoroscopic image. The result is an augmented live fluoroscopic image which represents the overlay of the angiographic overlay image data and the live fluoroscopic image.

In this step, the vascular structure as represented by the angiographic overlay image data becomes visible in the augmented live fluoroscopic image. It is thus possible to observe, for example, objects which are visible in the live fluoroscopic image with respect to the vascular structure of the patient.

According to the present invention, the fluoroscopic images of the image pairs are not stitched into a fluoroscopic panorama, which would result in distortions in overlapping areas of the neighbouring image pairs. To the contrary, the present invention registers a live fluoroscopic image with the fluoroscopic images of each image pair individually. A potential source of a distortion are parallax effects caused by the x-ray source of the medical imaging device emitting a conical x-ray beam. In the overlapping areas of the image pairs, the x-ray radiation does not pass the patient with the same angle and therefore images a different path through the patient. It is thus less error prone to match the live fluoroscopic image with the fluoroscopic images in the image pairs separately rather than with a fluoroscopic panorama.

In one embodiment, the method further comprises the step of displaying an overlay of the live fluoroscopic image with one or more of the fluoroscopic images of the image pairs separately. There is thus no overlay of the live fluoroscopic image with a fluoroscopic panorama, but of the live fluoroscopic image with one or more individual fluoroscopic images. The overlay is calculated using the spatial orientation between the live fluoroscopic image and each image pair as calculated in the fourth step of registering the live fluoroscopic image data with the fluoroscopic image data of each image pair.

As an optional step in this embodiment, user confirmation data can be input to confirm whether or not the overlay of the live fluoroscopic image with the one or more of the fluoroscopic images is acceptable to the user. If the overlay is acceptable, the registration is correct and the method can proceed. If the overlay is not acceptable, the step of registering the live fluoroscopic image data with the fluoroscopic image data of the respective image pair or each image pair can be repeated and/or the user can manually adjust the overlay of the live fluoroscopic image with the one or more fluoroscopic images in order to improve the registration.

In one embodiment, the second step of calculating the set of image pair registration data involves matching only the fluoroscopic image data of image pairs, matching only the angiographic image data of image pairs or matching both the fluoroscopic image data and the angiographic image data of the image pairs.

In the first two cases, the registration based on the fluoroscopic images or the angiographic images, respectively is used for determining the spatial orientation between two neighbouring image pairs. This reduces the computational load because only one registration process is necessary for a pair of two neighbouring image pairs. In the third case, the fluoroscopic image data of two neighbouring image pairs are registered and the angiographic image data of two neighbouring image pairs are registered, which results in two individually calculated spatial orientation. Those two spatial orientations do not necessarily have to be identical. In one embodiment, a (weighted) average of the two spatial orientations can be calculated and used as the spatial orientation between the two neighbouring image pairs.

In addition or as an alternative, the method can further comprise the step of outputting warning information if the spatial orientation obtained by matching the fluoroscopic image data differs from the spatial orientation obtained by matching the angiographic image data by more than a predetermined threshold. This warning information indicates that the registration might not be reliable. In this case, the step of calculating the image pair registration data for the pair of two neighbouring image pairs can be repeated.

In one embodiment, the method further comprises the step of calculating angiographic panoramic image data from the angiographic image data of the image pairs, wherein determining the angiographic overlay image data involves selecting a part or section of the angiographic panoramic image data.

In this embodiment, an angiographic panorama is stitched from the angiographic images and a section of the angiographic panorama which corresponds to the imaged part of the patient in the live fluoroscopic image is extracted and overlayed over the live fluoroscopic image. This section of the angiographic panorama does for example have the same size as the live fluoroscopic image.

A position of this section within the angiographic panorama is determined from the spatial orientation between the live fluoroscopic image and the image pairs. For example, it is determined from the set of image pair registration data with which of the image pairs the live fluoroscopic image overlaps. Since the set of image pair registration data was used to arrange the angiographic images when stitching the angiographic panorama from the angiographic images in the image pairs, and the live fluoroscopic image is registered with the image pairs, the position of the section of the angiographic panorama which corresponds to the live fluoroscopic image can be calculated.

This position can be calculated from the registration of the live fluoroscopic image and each of the image pairs which overlap with the live fluoroscopic image. In this case, the positions of the sections of the angiographic panorama can slightly differ and the final position of this section can be calculated as a (weighted) average of the individual positions.

In one embodiment, the step of determining the angiographic panoramic image data involves stitching the angiographic image data wherein overlapping parts of neighbouring angiographic image data are combined as a weighted sum. Any other suitable mathematical method can equivalently be used for combining overlapping parts of neighbouring angiographic images, like a multiplication or the like. As explained above, the parallax effects when capturing the angiographic images mean that the overlapping parts of neighbouring angiographic images are not exactly identical, such that a suitable combination of the angiographic images in those areas is necessary.

Since the parallax effect increase towards the edges of the images, one embodiment involves that the weights for the angiographic image data increase from an edge of the angiographic image towards the centre. This allows for a smoother blending of neighbouring angiographic images in the overlapping area while decreasing the artefacts the angiographic panorama caused by the parallax.

Selecting the angiographic overlay image data from an angiographic panorama is computationally effective once the angiographic panorama is determined. On the other hand, artefacts caused by the parallax may decrease the usability of the augmented live fluoroscopic image, in particular if an overlapping area of the angiographic images, and thus an area of the angiographic panorama having large artefacts, lies within a region of interest of the live fluoroscopic image, like the centre of the live fluoroscopic image.

This can be avoided if the angiographic overlay image data is not taken from an angiographic panorama, but from the individual angiographic images of the image pair, in particular if the live fluoroscopic image has a large overlap with one of the image pairs.

In one embodiment, when the live fluoroscopic image overlaps more than one fluoroscopic image of the image pairs, the method further comprises the step of determining overlapped area data representing overlapped areas of the angiographic images corresponding to those areas of the fluoroscopic images which are overlapped by the live fluoroscopic image. The step of determining the angiographic overlay image data uses the angiographic image data in the overlapped areas.

In one implementation, the step of determining the angiographic overlay image data involves using the angiographic image data only of the one angiographic image which has the largest overlapped area. In this case, no distortions or artefacts caused by parallax due to different propagation paths of the x-ray radiation through the patient occur since only the angiographic image of one image pair is used for determining the angiographic overlay image data. In this case, not all of the vascular structure in the field of view of the live fluoroscopic image is overlayed, but this might not be necessary, in particular if the vascular structure in a region of interest, such as a region in which a medical instrument is present, is overlayed.

In another implementation, the step of determining the angiographic overlay image data involves copying, from the angiographic image which has the largest overlapped area, all of the angiographic image data in its overlapped area and copying those parts of the angiographic image data of the overlapped areas of other angiographic images which do not overlap with said largest overlapped area. The image data copied from the overlapped areas of different angiographic images then form the angiographic overlay image data.

There is thus a hard cut in the angiographic overlay image data between the angiographic image data taken from the angiographic image which has the largest overlapped area and the other parts which are taken from other angiographic images. This might result in offsets of the vascular structures as shown in the augmented fluoroscopic image at the borders between overlapped areas, in particular in a direction orthogonal to the borders, but avoids distortions or artefacts which might result from blending image data of overlapped areas.

In one implementation, the step of determining the angiographic overlay image data involves copying the angiographic image data corresponding to those areas within overlapped areas of angiographic images which do not overlap with an overlapped area of another angiographic image and merging angiographic image data of areas where overlapped areas of different angiographic images overlap to form the angiographic overly image data.

In other words, in areas of the live fluoroscopic image which overlap with one image pair only, the angiographic overlay image data is copied from the angiographic image data of the corresponding image pair, and in areas of the live fluoroscopic image which overlap with more than one image pair, the angiographic image data of said image pairs are merged or blended. This avoids distortions or artefacts in areas in which the live fluoroscopic image overlaps one image pair only and achieves a smooth transition in areas in which it overlaps with multiple image pairs.

In one embodiment, the method further comprises the step of displaying a overlay of two neighbouring fluoroscopic images or of two neighbouring angiographic images based on the corresponding image pair registration data. In this embodiment, it is visualised to a user how two neighbouring image pairs overlap according to the calculated corresponding image pair registration data. The user can input confirmation data representing whether or not the calculated spatial orientation between neighbouring image pairs is correct or not. It shall be noted that this step of displaying an overlay is only for confirming the image registration. Even though a combined image of two neighbouring fluoroscopic images or two neighbouring angiographic images is displayed, this does not mean that a new data set representing the two neighbouring images as combined according to their spatial orientations is generated and stored. In particular, no panoramic image of the fluoroscopic images of the image pairs is calculated.

In one embodiment, the method further comprises the step of marking those areas of the overlay angiographic image data for which an overlay confidence value is outside of a predetermined interval. The overlay confidence value for example represents the quality of the overlay angiographic image data, for example by negatively correlating to the amount of distortion or artefacts in an area of the overlay angiographic image data due to parallax. The predetermined interval can be an interval about a predetermined value, wherein the predetermined value is not necessarily the center of the predetermined interval. The predetermined interval can be an open, closed or half-open interval. The predetermined interval can have an infinite endpoint. In this case, the predetermined interval comprises all values above or below a predetermined threshold.

With this additional step, a user can immediately identify areas of the augmented live fluoroscopic image in which the overlayed angiographic information might not be reliable enough.

In one implementation, the overlay confidence value is set to be below the predetermined threshold for an area in which the angiographic images of two or more image pairs are combined into the overlay angiographic image data and the overlay confidence value is set to be above the predetermined threshold in areas where the overlay angiographic image data is taken from the angiographic image of a single image pair.

In one implementation, the overlay confidence value in an area of the angiographic overlay image data negatively correlates to the distance between the viewing direction of the live fluoroscopic image and the viewing direction of the image pair from which the angiographic image data is used for said area of the overlay angiographic image data. The viewing direction is for example the central axis of a conical x-ray beam.

If the viewing directions coincide, the paths of the x-ray radiation through the patient when capturing the live fluoroscopic image and when capturing the corresponding image pair are (almost) identical, such that the live fluoroscopic image and the angiographic image of the corresponding image pair combine smoothly. But if the viewing directions are shifted, the angles at which the x-ray radiation propagates through the patient at a particular position differs for the two images, which results in different parallax.

In another implementation, the overlay confidence value is set to be below the predetermined threshold in an area of the overlay angiographic image data in which the overlay angiographic image data is not copied from an angiographic image which has the largest overlap area with the live fluoroscopic image, but from another angiographic images image.

In a second aspect, the invention is directed to a computer program comprising instructions which, when the program is executed by at least one computer, causes the at least one computer to carry out method according to the first aspect. The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program, i.e. comprising the program.

In a third aspect, the invention is directed to a computer-readable storage medium on which the program according to the second aspect is stored. The program storage medium is for example non-transitory.

In a fourth aspect, the invention is directed to at least one computer (for example, a computer), comprising at least one processor (for example, a processor), wherein the program according to the second aspect is executed by the processor, or wherein the at least one computer comprises the computer-readable storage medium according to the third aspect.

In a fifth aspect, the invention is directed to a medical system, comprising the at least one computer according to the fourth aspect and a medical imaging system.

Alternatively or additionally, the invention according to the fifth aspect is directed to a for example non-transitory computer-readable program storage medium storing a program for causing the computer according to the fourth aspect to execute the data processing steps of the method according to the first aspect.

For example, the invention does not involve or in particular comprise or encompass an invasive step which would represent a substantial physical interference with the body requiring professional medical expertise to be carried out and entailing a substantial health risk even when carried out with the required professional care and expertise.

For example, the invention does not comprise a step of administering a contrast agent to the patient. More particularly, the invention does not involve or in particular comprise or encompass any surgical or therapeutic activity. The invention is instead directed as applicable to combining images of two different imaging modalities taken at two different points in time. For this reason alone, no surgical or therapeutic activity and in particular no surgical or therapeutic step is necessitated or implied by carrying out the invention.

The present invention also relates to the use of the device/system or any embodiment thereof for overlaying angiographic information over a fluoroscopic image of a patient.

Definitions

In this section, definitions for specific terminology used in this disclosure are offered which also form part of the present disclosure.

Computer Implemented Method

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Acquiring Data

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Image Registration

Image registration is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

Marker

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

Marker Device

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Reference Star

A "reference star" refers to a device with a number of markers, advantageously three markers, attached to it, wherein the markers are (for example detachably) attached to the reference star such that they are stationary, thus providing a known (and advantageously fixed) position of the markers relative to each other. The position of the markers relative to each other can be individually different for each reference star used within the framework of a surgical navigation method, in order to enable a surgical navigation system to identify the corresponding reference star on the basis of the position of its markers relative to each other. It is therefore also then possible for the objects (for example, instruments and/or parts of a body) to which the reference star is attached to be identified and/or differentiated accordingly. In a surgical navigation method, the reference star serves to attach a plurality of markers to an object (for example, a bone or a medical instrument) in order to be able to detect the position of the object (i.e. its spatial location and/or alignment). Such a reference star for example features a way of being attached to the object (for example, a clamp and/or a thread) and/or a holding element which ensures a distance between the markers and the object (for example in order to assist the visibility of the markers to a marker detection device) and/or marker holders which are mechanically connected to the holding element and which the markers can be attached to.

Surgical Navigation System

A navigation system, such as a surgical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU) and a working memory and advantageously an indicating device for issuing an indication signal (for example, a visual indicating device such as a monitor and/or an audio indicating device such as a loudspeaker and/or a tactile indicating device such as a vibrator) and a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

Imaging Methods

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray Radiography (https://en.wikipedia.org/wiki/Radiography), magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia.

The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

Elastic Fusion, Image Fusion/Morphing, Rigid

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
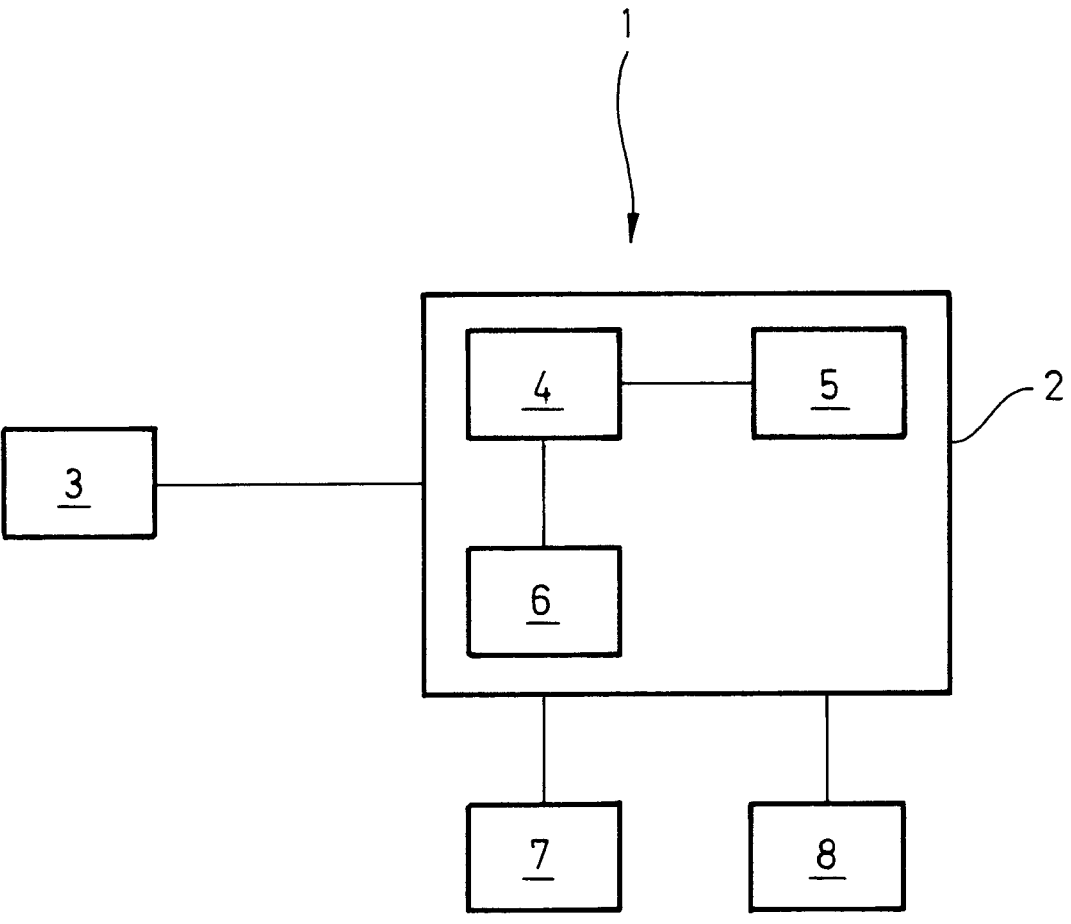
FIG. 1 shows a medical system for implementing the invention.

FIG. 1 is a schematic illustration of a medical system 1 according to the fifth aspect. The system is in its entirety identified by reference sign 1 and comprises a computer 2 comprising a processing unit 4, an electronic data storage device (such as a hard disc) 5, also referred to as memory, for storing different kinds of image data and an interface 6 for connecting the computer 2 to other devices of the system 1, such as a medical imaging device 3, an input device 7, such as a mouse, a keyboard, a touch sensitive surface, and an output device 8, such as a monitor. The medical imaging device 3, the input device 7 and the output device 8 are also components of the medical system 1. The components of the medical system 1 have the functionalities and properties explained above with regard to the fifth aspect of this disclosure.

The medical imaging device 3 is an x-ray imaging device emitting a conical x-ray beam which propagates through a target and hits a detector which converts the incident x-ray radiation into a medical image. The x-ray source and the x-ray detector are for example attached to the same carrier structure, such as a C-arm.

Figure 2:
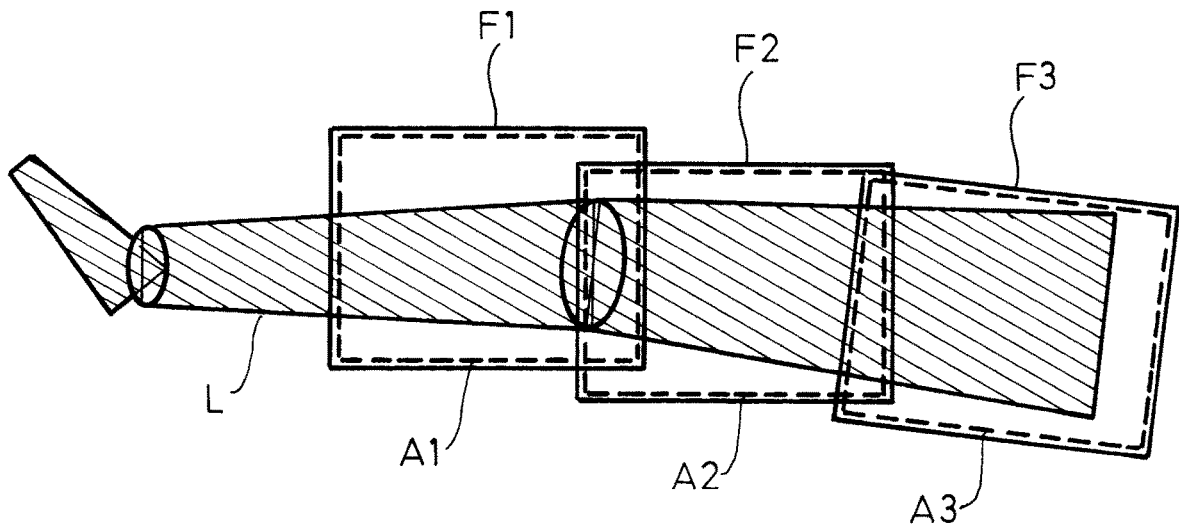
FIG. 2 shows three image pairs of a leg.

FIG. 2 shows an exemplary application of the system 1 of FIG. 1. In this example, a leg L of a patient is imaged. Since the field of view of the medical imaging device 3 is too small to capture the complete region of interest, which in the present case is the major part of the leg L, a plurality of images are captured in sequence.

First, the medical imaging device 3 is brought into a first position relative to the leg L and captures an image pair comprising a fluoroscopic image F1 and an angiographic image A1. The fluoroscopic image F1 is captured without the administration of a contrast agent. Then, a contrast image, or raw angiographic image, is captured after the administration of a contrast agent and the angiographic image A1 is calculated as the difference between the contrast image and the fluoroscopic image F1. The angiographic image A1 therefore shows a part of the vascular structure of the leg L, which is shown in the contrast image, but not in the fluoroscopic image F1.

The medical imaging device 3 is then brought into a second and a third position relative to the leg L for capturing the second and third image pair, respectively, comprising the fluoroscopic image F2 and the angiographic image A2 and the fluoroscopic image F3 and angiographic image A3, respectively.

The computer 2 acquires the image pairs, represented by corresponding image pair data, from the medical imaging system 3 and stores them in the memory 5. Each image pair comprises a fluoroscopic image and an angiographic image, such that each image pair data comprises fluoroscopic image data and angiographic image data. As an alternative, the computer acquires the fluoroscopic images F1 to F3 and the raw angiographic images from the medical imaging system. The processing unit then calculates the angiographic images A1 to A3 and stores them in the memory 5.

In FIG. 2, the fluoroscopic images are indicated as continuous boxes, while the (raw) angiographic images are indicated as dashed boxes. The dashed boxes are shown slightly smaller than the continuous boxes for illustrative purposes only. Since the (raw) angiographic image and the fluoroscopic image of an image pair are captured with the same position of the medical imaging device 3 relative to the leg L, the actual sizes of the fluoroscopic image and the (raw) angiographic image are identical.

As can be seen from FIG. 2, two neighbouring image pairs partially overlap, which means that a part of the leg L is shown in each one of the neighbouring image pairs.

Figure 3:
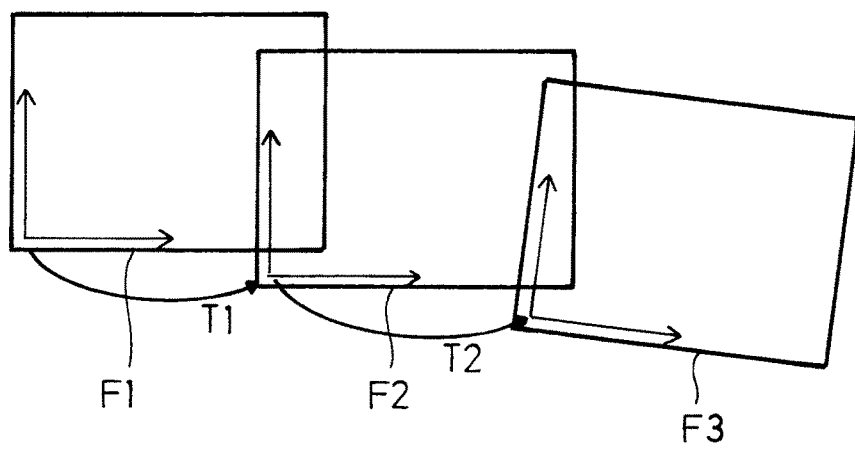
FIG. 3 shows the spatial orientations between the image pairs.

FIG. 3 shows reference systems represented by two arrows assigned to each image pair, and thus to each fluoroscopic image F and each angiographic image A. The arrows represent a reference system associated with an image pair. FIG. 3 further shows two transformations T1 and T2 which represent the spatial orientation between two neighbouring image pairs. The transformation T1 represents the position of the reference system of the second image pair in the reference system of the first image pair and the transformation T2 represents the position of the reference system of the third image pair in the reference system of the second image pair.

In the first spatial orientation represented by transformation T1, the areas of the fluoroscopic images F1 and F2 showing the same part of the leg L overlap each other. In the spatial orientation represented by the transformation T2, the areas of the fluoroscopic images F2 and F3 which show the same part of the leg L overlap each other.

The processing unit 4 of the computer 2 then calculates a set of image pair registration data in terms of the transformations T1 and T2 representing the spatial orientation between two neighbouring image pairs. In the present embodiment, this involves registering or matching fluoroscopic images F1 and F2 to obtain the transformation T1. A two-dimensional shift in the plane spanned by the two arrows and a rotation about an axis perpendicular to the two arrows is calculated which minimizes the sum of the difference between pixel values of the two fluoroscopic images in an area in which they overlap. In the same manner, the transformation T2 representing the spatial orientation between the fluoroscopic images F2 and F3 is calculated. Since the three angiographic images A1 to A3 are captured from the same position and viewing direction onto the leg L as the fluoroscopic images F1 to F3, respectively, the transformation T1 also represents the spatial orientation between the angiographic images A1 and A2 and the transformation T2 represents the spatial orientation between the angiographic images A2 and A3.

Any known technique for matching or registering images can be used. In one implementation, the position of a medical imaging system 3 relative to the leg L when capturing the image pairs can be determined, for example using a medical tracking system, and this information can be used as a basis or starting point for registering the images.

Figure 4:
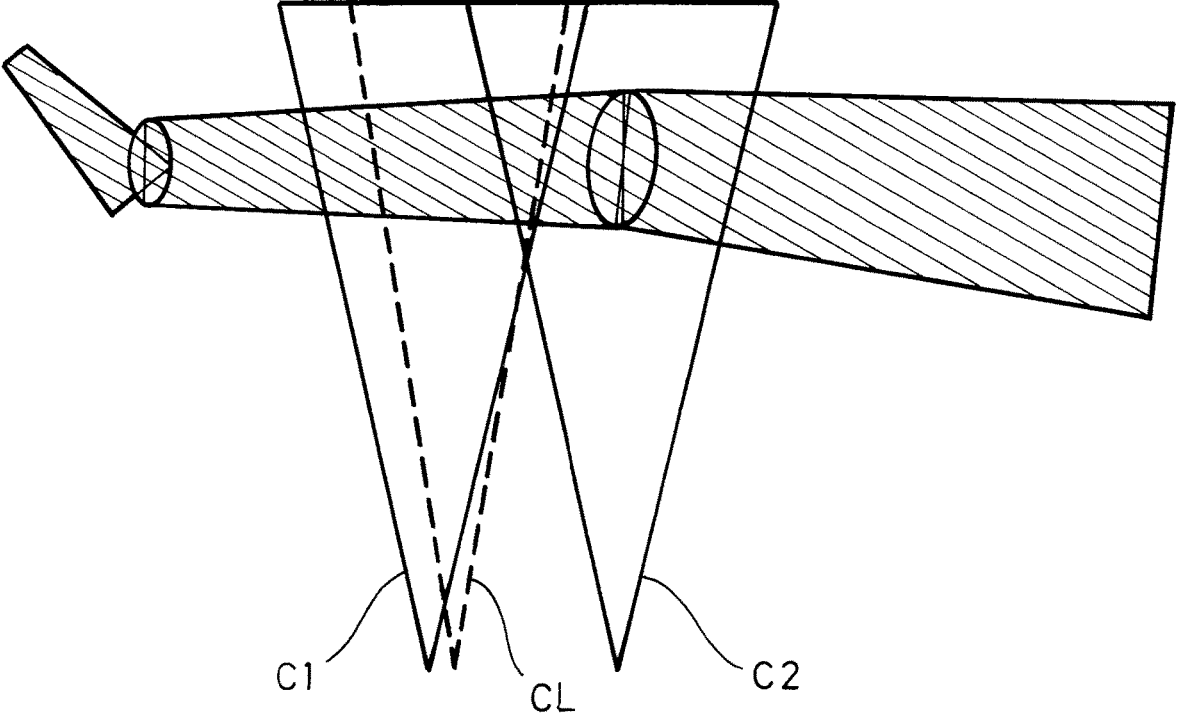
FIG. 4 shows the parallax effect.

The computer 2 then acquires a live fluoroscopic image from the medical imaging system 3. As shown in FIG. 4, the images F1 and A1 of the first image pair are captured using a conical x-ray beam C1 and the images A2 and F2 of the second image pair are captured using a conical x-ray beam C2. The live fluoroscopic image is captured using a conical x-ray beam CL, which is indicated by dashed lines. The size of the conical beam CL is smaller than the size of the conical beam C1 and C2 for illustrative purposes only. The conical beam CL can be smaller, of the same size or larger than the conical beams C1 and C2.

As can be seen from FIG. 4, only the central axis of a conical x-ray beam is perpendicular to the image plane of the x-ray detector. All other parts of the conical beam are angled or slanted. This means that the x-ray radiation used when capturing adjacent image pairs does not follow the same path through the leg L of the patient, even when parts of the two image pairs image the same portion of the leg L. This is also referred to as the parallax effect. The parallax effect means that areas of two neighbouring image pairs imaging the same portion of the leg L are different from each other, such that there is no perfect match between neighbouring image pairs in those areas. The parallax effect increases towards the boundary of the conical beam when an observation angle, which is the angle between the central axis of the conical beam and a line along which the x-ray radiation propagates through the leg before hitting the x-ray detector, increases.

Figure 5:
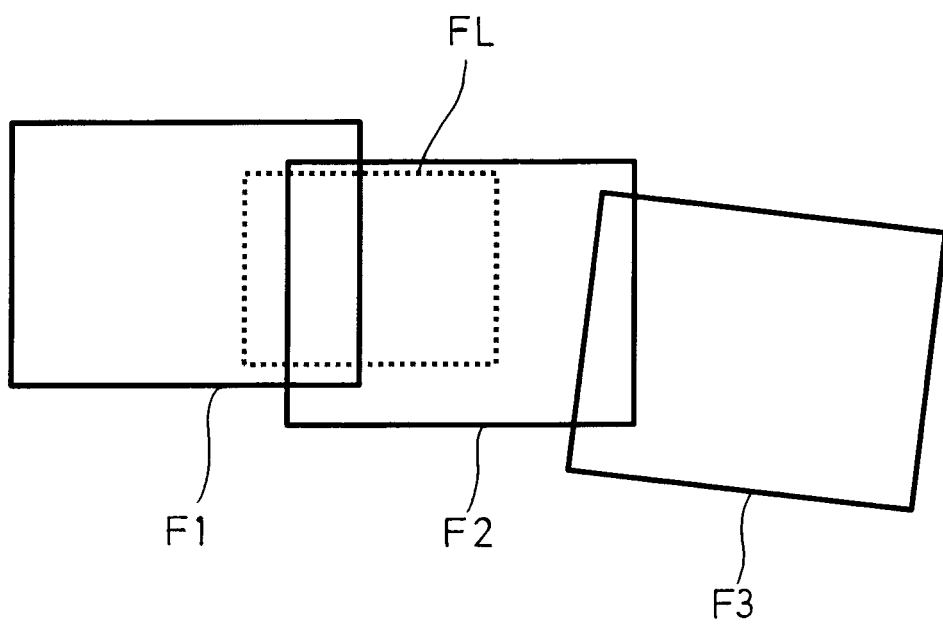
FIG. 5 shows a live fluoroscopic image relative to the image pairs.

FIG. 5 shows the live fluoroscopic image FL relative to the fluoroscopic images F1 to F3 of the three image pairs. In the present example, the live fluoroscopic image FL partially overlaps the fluoroscopic images F1 and F2, but not the fluoroscopic image F3. The processing unit 4 of the computer 2 registers the live fluoroscopic image FL with the fluoroscopic images F1, F2 and F3 in order to obtain the spatial orientation between the live fluoroscopic image FL and each image pair. In the present case, the central processing unit 4 finds matches of the live fluoroscopic image FL with the two fluoroscopic images F1 and F2, but not with the fluoroscopic image F3.

Figure 6:
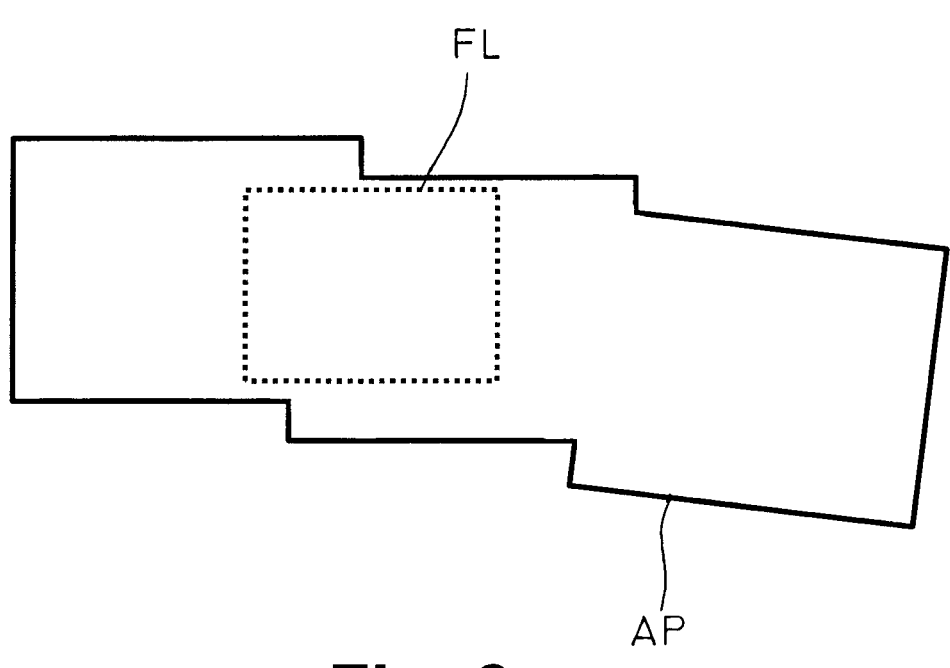
FIG. 6 shows the live fluoroscopic image relative to an angiographic panorama.

The processing unit 4 of the computer 2 reads the three angiographic images A1 to A3 from the memory 5 and stitches them into an angiographic panorama AP shown in FIG. 6 based on the image pair registration data which describe how the image pairs have to be arranged.

Since the spatial orientation of the live fluoroscopic image FL relative to the fluoroscopic images F1 and F2 is known due to the registration mentioned above, the spatial orientation of the live fluoroscopic image FL relative to the angiographic panorama AP is also known. The processing unit 4 then copies an area of the angiographic panorama AP corresponding to the fluoroscopic image FL and overlays it over the live fluoroscopic image FL, resulting in an augmented live fluoroscopic image and displays the augmented live fluoroscopic image.

Figure 8:
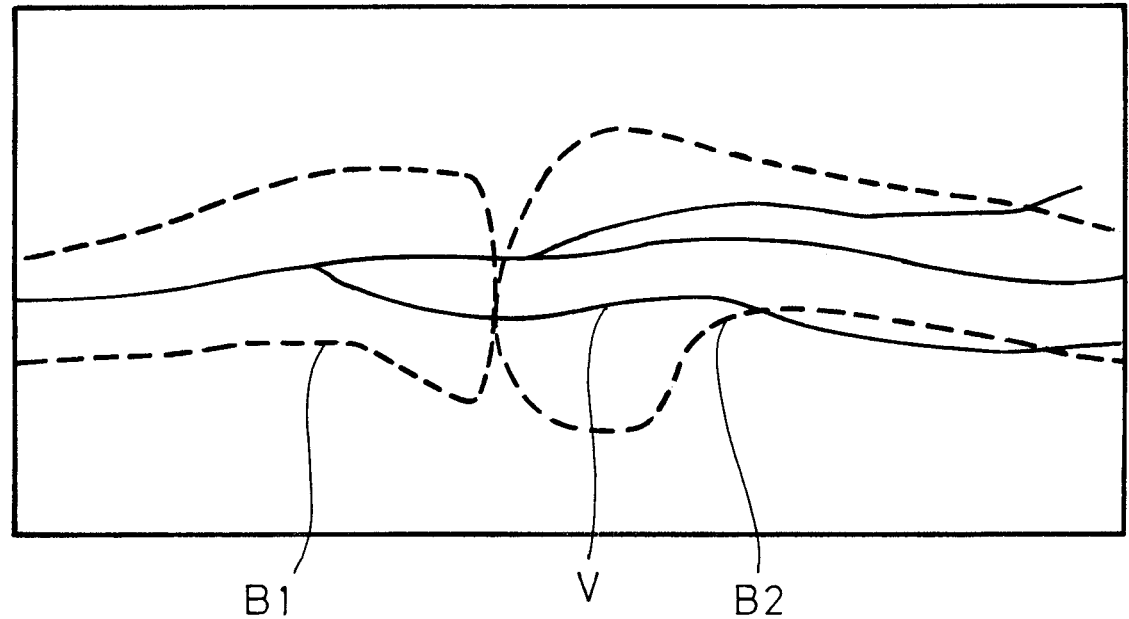
FIG. 8 shows an overlay of angiographic information over a live fluoroscopic image.

An exemplary screen showing an augmented live fluoroscopic image is shown in FIG. 8, where the live fluoroscopic image shows the bones B1 and B2 and the angiographic information V showing the vascular structure is overlayed. The angiographic overlay image data copied from the image data of the angiographic panorama AP represents the angiographic information V. The exemplary screen is displayed on the display unit 7.

The part of the angiographic panorama AP selected for overlay correspond to the angiographic overlay image data, which is a portion of the angiographic panoramic image data.

According to the present invention, the fluoroscopic images F1 to F3 of the three image pairs are not stitched into a fluoroscopic panorama and the live fluoroscopic image is not registered with the fluoroscopic panorama. Due to the parallax effect, the fluoroscopic panorama would have areas comprising distortions or artefacts caused by combining areas of the fluoroscopic images having different propagation paths of the x-ray radiation. This could impair the result of registration of the live fluoroscopic image with the fluoroscopic panorama. This is avoided by registering the live fluoroscopic image with each of the fluoroscopic images F1 to F3 instead.

Figure 7:
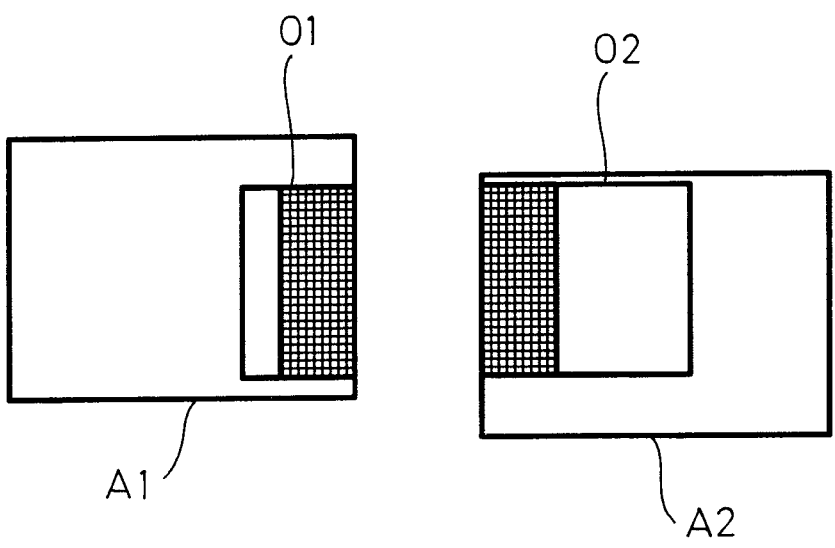
FIG. 7 shows overlapped areas of angiographic images.

FIG. 7 shows an alternative implementation which does not involve the calculation of the angiographic panorama AP. In the example shown in FIG. 7, the live fluoroscopic image FL overlaps the first image pair and thus the fluoroscopic image F1 and the angiographic image A1 in the overlapped area O1. Similarly, the live fluoroscopic image FL overlaps the second image pair, and thus the fluoroscopic image F2 as the angiographic image A2, in the overlapped area O2. The hatched areas shown in FIG. 7 are those areas in which the overlapped areas O1 and O2 overlap. In the area in which the two overlapped areas O1 and O2 overlap, the angiographic information to be overlayed over the live fluoroscopic image can be derived from the angiographic image A1, the angiographic image A2 or a combination thereof.

In the example shown in FIG. 7, the overlapped area O2 is larger than the overlapped area O1. In fact, there is only a small area of the live fluoroscopic image FL which does not overlap the angiographic image A2. In this case, the angiographic image data of the overlapped area O2 of the angiographic image A2 is determined as the angiographic overlay image data and overlayed over the live fluoroscopic image FL. Depending on for example the fraction of the live fluoroscopic image FL which does not overlap with the angiographic image A2, the angiographic overlay image data may or may not be supplemented by angiographic image data of the angiographic image A1 in the overlapped area O1.

If the angiographic overlay image data is supplemented with angiographic image data of the angiographic image A1, there can be a hard transition between the angiographic image data taken from the angiographic image A2 and the angiographic image data taken from the angiographic image A1. However, there can also be a smooth or blended transition in the area or part of the area in which the overlapped areas O1 and O2 overlap.

Figure 9:
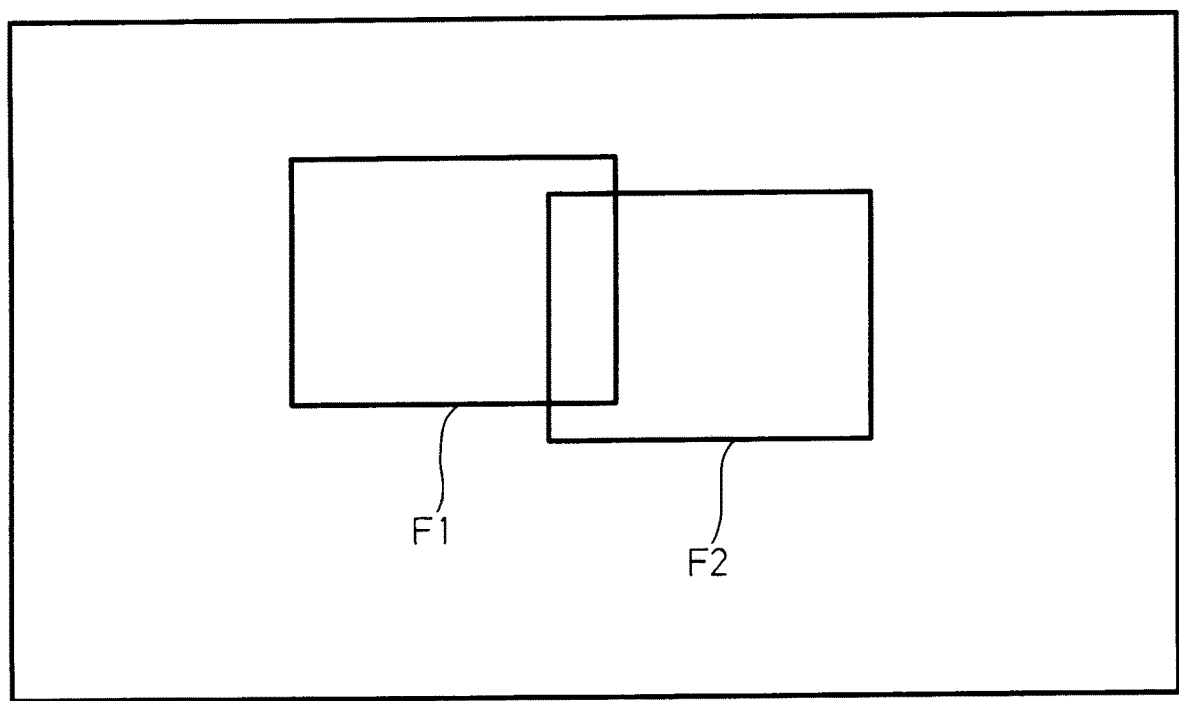
FIG. 9 shows an overlay of two fluoroscopic images.

FIG. 9 shows an example in which an overlay of two neighbouring fluoroscopic images F1 and F2 is displayed on the display device 7. In this overlay, a user of the system 1 can verify whether or not the registration of the fluoroscopic images F1 and F2 with each other is correct. The user can then input verification data via the input device 8. The user can for example input verification data indicating that the registration is correct. The user can also input verification data by shifting and/or rotating the two fluoroscopic images F1 and F2 relative to each other until the overlay is correct. Based on this verification data, the processing unit 4 can update the image pair registration data belonging to the first and second image pairs comprising the fluoroscopic images F1 and F2, respectively.

Figure 10:
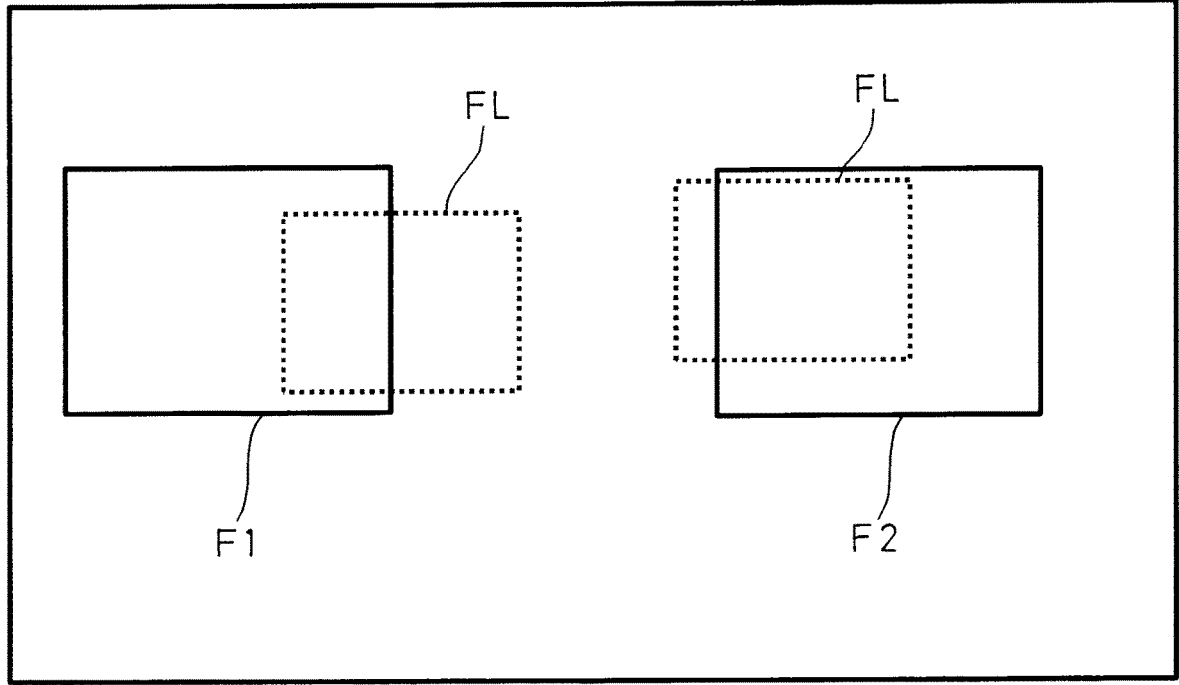
FIG. 10 shows overlays of two fluoroscopic images with the live fluoroscopic image.

FIG. 10 shows an exemplary screen displayed on the display device 7 and comprising an overlay of the live fluoroscopic image with the fluoroscopic image F1 and an overlay of the live fluoroscopic image FL with the fluoroscopic image F2. The user of the system 1 can analyze those overlays to determine whether or not the registration of the live fluoroscopic image FL with the fluoroscopic images F1 and F2 is correct. The user can then input verification data via the input device 8. The verification data can indicate that the registration is correct. The verification data can also indicate a shift and/or rotation of the live fluoroscopic image FL relative to the fluoroscopic images F1 and F2. Based on the verification data, the processing unit 4 can update the registration of the live fluoroscopic image FL with the image pairs.

It shall be emphasized that the fluoroscopic image FL is not overlayed over a fluoroscopic panorama of the fluoroscopic images F1 and F2 but with each one of the fluoroscopic images F1 and F2 separately.

Figure 11:
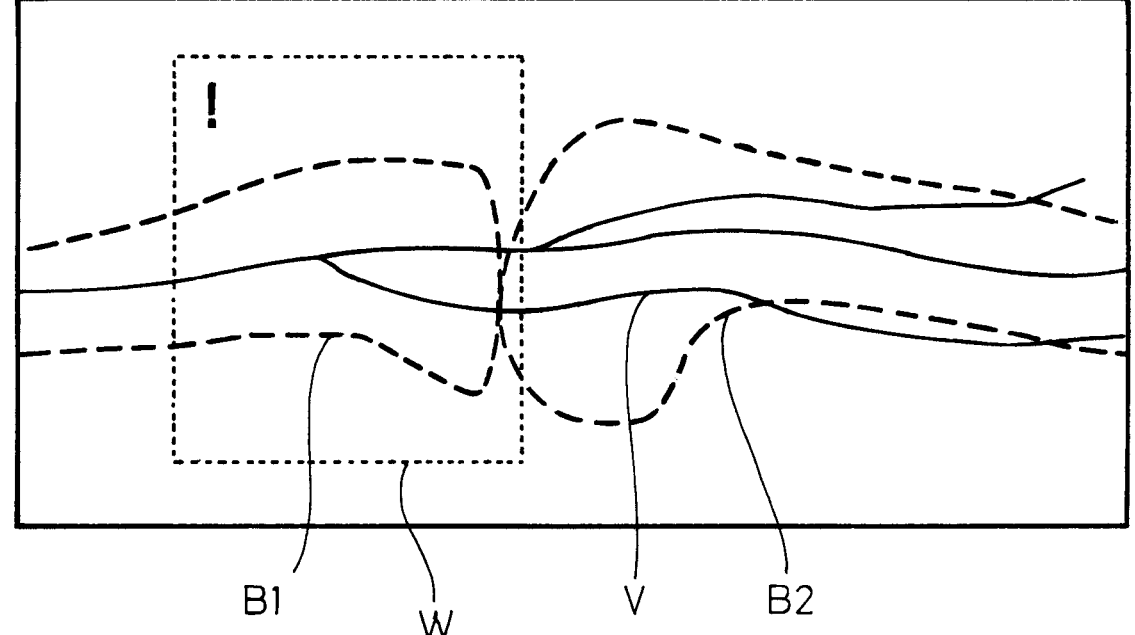
FIG. 11 shows the overlay of FIG. 8 with an additional warning.

FIG. 11 shows an exemplary screen showing the overlay of an angiographic overlay image data over the live fluoroscopic image FL. Like in FIG. 8, the bones B1 and B2 are shown by the live fluoroscopic image FL and the vascular structure V is represented by the angiographic overlay image data.

The screen further shows a warning box W indicating that the angiographic overlay image data inside the box W might not be as precise as desired. This might be caused by strong distortions or artifacts caused by the parallax effect. The area W can for example indicate the area in which the overlapped areas O1 and O2 overlap and the angiographic images A1 and A2 are combined with each other in order to obtain the angiographic overlay image data.

The area W indicates an area of the overlay angiographic image data for which an overlay confidence value is below a predetermined threshold. As explained above, it can be defined that the overlay confidence value is below the predetermined threshold in an area in which the overlapped areas O1 and O2 overlap. In another implementation, the overlay confidence value can be set to be below the predetermined threshold for an area in which the angle of the x-ray radiation which propagates through the leg L deviates from the central axis of the conical beam by more than a predetermined angle. In this case, there is a large parallax.

The invention claimed is:

1. A method of overlaying angiographic information over a fluoroscopic image of a patient, executed by one or more processors of a fluoroscopy system having an X-ray source, a detector, and a display, the method comprising:

acquiring, via the one or more processors, a plurality of image pair data, each image pair data representing an image pair and comprising fluoroscopic image data and angiographic image data representing a fluoroscopic image and an angiographic image, respectively, of a part of the patient, the fluoroscopic image and the angiographic image of an image pair being taken from the same position and the same viewing direction onto the patient, calculating, via the one or more processors, a set of image pair registration data, each image pair registration data representing the spatial orientation between two neighbouring image pairs, acquiring, via the one or more processors, live fluoroscopic image data representing a live fluoroscopic image of the patient, registering, via the one or more processors, the live fluoroscopic image data individually with the fluoroscopic image data of each image pair, thus obtaining a plurality of distinct spatial orientations between the live fluoroscopic image and each corresponding image pair, determining, via the one or more processors, angiographic overlay image data from the angiographic image data based on the plurality of distinct spatial orientations between the live fluoroscopic image and each corresponding image pair, and overlaying the angiographic overlay image data over the live fluoroscopic image.

2. The method of claim 1, further comprising the step of displaying an overlay of the live fluoroscopic image with one or more of the fluoroscopic images of the image pairs separately.

3. The method of claim 1, wherein the step of calculating the set of image pair registration data involves matching only the fluoroscopic image data of image pairs, matching only the angiographic image data of image pairs or matching both the fluoroscopic image data and the angiographic image data of image pairs.

4. The method of claim 3, further comprising the step of outputting warning information if the spatial orientation obtained by matching of the fluoroscopic image data differs from the spatial orientation obtained by matching the angiographic image data by more than a predetermined threshold.

5. The method of claim 1, further comprising the step of calculating angiographic panoramic image data from the angiographic image data of the image pairs, wherein determining the angiographic overlay image data involves selecting a part of the angiographic panoramic image data.

6. The method of claim 5, wherein the step of determining the angiographic panoramic image data involves stitching the angiographic image data, wherein overlapping parts of neighbouring angiographic image data are combined as a weighted sum.

7. The method of claim 6, wherein weights for the angiographic image data increase from an edge of the angiographic image towards the center.

8. The method of claim 1, wherein, when the live fluoroscopic image overlaps more than one fluoroscopic image of the image pairs, the method further comprises the step of determining overlapped area data representing overlapped areas of the angiographic images corresponding to those areas of the fluoroscopic images which are overlapped by the live fluoroscopic image and the step of determining the angiographic overlay image data uses the angiographic image data in the overlapped areas.

9. The method of claim 8, wherein the step of determining the angiographic overlay image data involves using the angiographic image data only of the one angiographic image which has the largest overlapped area.

10. The method of claim 8, wherein the step of determining the angiographic overlay image data involves copying, from the angiographic image which has the largest overlapped area, all of the angiographic image data in its overlapped area and copying those parts of the angiographic image data of the overlapped areas of other angiographic images which do not overlap with said largest overlapped area.

11. The method of claim 8, wherein the step of determining the angiographic overlay image data involves copying the angiographic image data corresponding to those areas within overlapped areas of angiographic images which do not overlap with an overlapped area of another angiographic image and merging angiographic image data of areas where overlapped areas of different angiographic images overlap.

12. The method of claim 1, further comprising the step of displaying an overlay of two neighbouring fluoroscopic images or of two neighbouring angiographic images based on the corresponding image pair registration data.

13. The method of claim 1, further comprising the step of marking those areas of the overlay angiographic image data for which an overlay confidence value is outside a predetermined range.

14. A non-transitory computer readable medium comprising instructions which, when executed, cause at least one processor to perform operations, the operations comprising:

acquire, via the one or more processors, a plurality of image pair data, each image pair data representing an image pair and comprising fluoroscopic image data and angiographic image data representing a fluoroscopic image and an angiographic image, respectively, of a part of the patient, the fluoroscopic image and the angiographic image of an image pair being taken from the same position and the same viewing direction onto the patient, calculate, via the one or more processors, a set of image pair registration data, each image pair registration data representing the spatial orientation between two neighbouring image pairs, acquire, via the one or more processors, live fluoroscopic image data representing a live fluoroscopic image of the patient, register, via the one or more processors, the live fluoroscopic image data individually with the fluoroscopic image data of each image pair, thus obtaining a plurality of distinct spatial orientations between the live fluoroscopic image and each corresponding image pair, determine, via the one or more processors, angiographic overlay image data from the angiographic image data based on the plurality of distinct spatial orientations between the live fluoroscopic image and each corresponding image pair, and overlay the angiographic overlay image data over the live fluoroscopic image.

15. A medical system, comprising:

at least one processor having associated memory, the associated memory having instructions which, when executed by the at least one processor, cause the at least one processor to:

acquire, via the one or more processors, a plurality of image pair data, each image pair data representing an image pair and comprising fluoroscopic image data and angiographic image data representing a fluoroscopic image and an angiographic image, respectively, of a part of the patient, the fluoroscopic image and the angiographic image of an image pair being taken from the same position and the same viewing direction onto the patient, calculate, via the one or more processors, a set of image pair registration data, each image pair registration data representing the spatial orientation between two neighbouring image pairs, acquire, via the one or more processors, live fluoroscopic image data representing a live fluoroscopic image of the patient, register, via the one or more processors, the live fluoroscopic image data individually with the fluoroscopic image data of each image pair, thus obtaining a plurality of distinct spatial orientations between the live fluoroscopic image and each corresponding image pair, determine, via the one or more processors, angiographic overlay image data from the angiographic image data based on the plurality of distinct spatial orientations between the live fluoroscopic image and each corresponding image pair, and overlay the angiographic overlay image data over the live fluoroscopic image.

* * * * *